United States Patent
Zhang et al.

(10) Patent No.: US 8,439,095 B2
(45) Date of Patent: May 14, 2013

(54) TIRE HAVING TREAD WITH AN INTERNAL SOFTER TRANSITION RUBBER LAYER CONTAINING SHORT FIBER REINFORCEMENT

(75) Inventors: Ping Zhang, Hudson, OH (US); Paul Harry Sandstrom, Cuyahoga Falls, OH (US); Junling Zhao, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 567 days.

(21) Appl. No.: 12/724,440

(22) Filed: Mar. 16, 2010

(65) Prior Publication Data
US 2011/0226396 A1    Sep. 22, 2011

(51) Int. Cl.
*B60C 1/00*    (2006.01)
*B60C 11/00*    (2006.01)

(52) U.S. Cl.
USPC ............ 152/209.4; 152/209.5; 152/458; 152/532

(58) Field of Classification Search ......... 152/209.4, 152/209.5, 458, 532
See application file for complete search history.

(56) References Cited

U.S. PATENT DOCUMENTS

| | | | |
|---|---|---|---|
| 4,739,811 A * | 4/1988 | Rampl | 152/209.5 |
| 5,576,104 A * | 11/1996 | Causa et al. | 152/458 |
| 6,959,743 B2 | 11/2005 | Sandstrom | 152/209.5 |
| 7,198,744 B2 | 4/2007 | Peronnet-Paquin et al. | 264/173.11 |
| 2001/0006086 A1 | 7/2001 | Benko et al. | 152/543 |
| 2007/0137745 A1 | 6/2007 | Lukich et al. | 152/209.5 |
| 2007/0144642 A1 | 6/2007 | Lukich et al. | 152/209.5 |
| 2008/0066839 A1 | 3/2008 | Sandstrom et al. | 152/209.5 |
| 2008/0066840 A1 | 3/2008 | Sandstrom et al. | 152/209.5 |
| 2010/0018618 A1 | 1/2010 | Moorhead et al. | 152/209.5 |

FOREIGN PATENT DOCUMENTS

| | | |
|---|---|---|
| EP | 1085048 | 3/2001 |
| EP | 1454765 | 9/2004 |
| EP | 1897702 | 3/2008 |
| EP | 2039531 | 3/2009 |
| JP | 59-153606 A * | 9/1984 |
| JP | 60-116505 A * | 6/1985 |
| JP | 03-007602 A * | 1/1991 |
| JP | 2668358 B2 * | 10/1997 |
| JP | 11-278015 A * | 10/1999 |
| JP | 2004-284453 A * | 10/2004 |

OTHER PUBLICATIONS

Machine translation for Japan 2,668,358 (no date).*
Machine translation for Japan 2004-284453 (no date).*
Machine translation for Japan 11-27801 5 (no date).*
Translation for Japan 03-007602 (no date).*
European Search Report completed Jul. 22, 2011.

* cited by examiner

*Primary Examiner* — Steven D Maki
(74) *Attorney, Agent, or Firm* — Henry C. Young, Jr.

(57) ABSTRACT

The invention relates to a tire having a rubber tread comprised of a circumferential outer cap rubber layer which contains a tread running surface and an underlying undertread layer of softer rubber than said outer tread cap rubber layer wherein said undertread layer rubber composition contains short fiber reinforcement.

3 Claims, 2 Drawing Sheets

TIRE HAVING TREAD WITH AN INTERNAL SOFTER TRANSITION RUBBER LAYER CONTAINING SHORT FIBER REINFORCEMENT

FIELD OF THE INVENTION

The invention relates to a tire having a sandwich configured rubber tread comprised of a circumferential outer tread cap rubber layer which contains a tread running surface, a circumferential internal vertically softer transition rubber layer, as an undertread rubber layer, positioned between said outer tread cap rubber layer and an underlying circumferential tread base rubber layer wherein said softer internal transition rubber layer rubber composition contains short fibrillated aramid fiber reinforcement.

BACKGROUND AND PRESENTATION OF THE INVENTION

Pneumatic rubber tire treads are typically configured with a circumferential outer cap rubber layer which contains a running surface for the tire for contacting the road, and an underlying tread base rubber layer (underlying said outer tread cap rubber layer).

The outer tread cap layer is typically intended to promote a tire running surface with suitable resistance to tread wear, with good wet and dry traction for the road and suitable stiffness to promote handling and steering performance for the tire.

A challenge is presented to promote a softer vehicular ride, translating to increased vehicular comfort in a sense of a softer vehicular ride in a manner which is a departure from past practice.

One way to promote a softer vehicular ride is to use a softer (reduced stiffness property) rubber composition for the tread.

The stiffness of a tread rubber composition can be made reduced, or made softer, for example, by use of a lower surface area particulate rubber reinforcing filler, by use of a reduced amount of reinforcing filler content in the rubber composition and/or by use of an increased amount of rubber processing oil content in the rubber composition.

However, such reduced stiffness (softer) tread rubber composition would be expected to lower desirable tire tread performance such as wet and dry road traction and reduced wear resistance which would lead to increased treadwear. Further, vehicular handling and/or steering would also be expected to be negatively affected.

For this invention, it is proposed to use an intermediate transition rubber layer underlying said tread cap rubber layer and between the tread cap rubber layer and a tread base rubber layer which is a softer rubber (reduced stiffness property) than the outer tread cap rubber.

A challenge is presented to provide such softer transition rubber layer (significantly softer than the tread cap rubber) composed of a significantly softer rubber composition (very low Shore A hardness) with a significantly high low strain modulus property in both the circumferential directional plane of the tire tread and the lateral directional plane of the tire tread to promote directional stability for the tire tread with a view toward promoting vehicular ride comfort as well as handling stability for the tread.

In this manner, desirable outer tread cap rubber wet and dry traction properties as well as treadwear resistance would intended to be maintained while a softer vehicular ride for the tire itself is promoted.

However, it is envisioned that use of the softer intermediate rubber layer would be expected to provide, or promote, reduced stiffness of the tire tread in its lateral directional plane (side-to-side direction), to thereby sacrifice handling and steering (turning) performance of the tire.

For the purposes of this invention, an evaluation of providing an inclusion of a dispersion of fibrillated aramid short fiber reinforcement within the softer rubber composition of the intermediate transition rubber layer its rubber composition to promote the stiffness of the intermediate tread rubber layer in both its circumferential and in its lateral direction (side-to-side direction), to thereby promote steering and handling performance of the tire.

It is appreciated that an orientation of the short fibrillated aramid fibers in the circumferential directional plane of the tread running surface, for the intermediate rubber layer, can be accomplished by conventional calendering or extrusion of the rubber composition to thereby promote reinforcement of the rubber composition layer in the circumferential directional plane of the tread intermediate layer.

However, it is an important aspect of this invention to evaluate whether such fiber orientation of the short fibrillated aramid fiber may also provide reinforcement of the rubber composition layer of the soft intermediate rubber layer of the tread in the lateral circumferential direction (side-to-side direction) of the tread intermediate layer.

In the description of this invention, the terms "rubber" and "elastomer" where used, are used interchangeably, unless otherwise prescribed. The terms "rubber composition", "compounded rubber" and "rubber compound", where used, are used interchangeably to refer to "rubber which has been blended or mixed with various ingredients" and the term "compound" relates to a "rubber composition" unless otherwise indicated. Such terms are well known to those having skill in the rubber mixing and rubber compounding art.

In the description of this invention, the term "phr" refers to parts of a respective material per 100 parts by weight of rubber, or elastomer. The terms "cure" and "vulcanize" are used interchangeably unless otherwise indicated.

SUMMARY AND PRACTICE OF THE INVENTION

In accordance with this invention, a tire is provided having a rubber tread comprised of a circumferential tread outer cap rubber layer and a transition rubber layer underlying said tread outer cap rubber layer (undertread rubber layer);

wherein said outer tread cap rubber layer is comprised of a lug and groove configuration with raised lugs having tread running surfaces on the outer surfaces of said lugs (said running surfaces intended to be ground-contacting) and grooves positioned between said lugs, wherein said transition rubber layer is excluded from the running surface of the tire and is a non-cellular rubber composition;

wherein the rubber composition of said transition rubber layer is comprised of:

(A) a blend of conjugated diene-based elastomers as natural (cis 1,4-polyisoprene) rubber, cis 1,4-polybutadiene rubber and styrene/butadiene copolymer rubber (organic solution or aqueous emulsion polymerization prepared styrene/butadiene copolymer rubber);

(B) zero up to about 30, alternately from about 5 to about 25, phr of reinforcing filler comprised of:
 (1) rubber reinforcing carbon black, or
 (2) amorphous synthetic silica (precipitated silica), or (3) a combination of rubber reinforcing carbon black and precipitated silica;

wherein said transition rubber layer (undertread) has a stiffness property as:

(C) Shore A hardness (23° C.) in a range of from 20 to about 50, alternately from about 25 to about 45, and preferably at least 10 Shore A hardness (23° C.) units less than the Shore A hardness of the rubber composition of the tread cap rubber layer;

(D) 100 percent parallel (circumferential) tensile modulus of at least 1 MPa, and (E) 100 percent pendicular (lateral) tensile modulus of at least 0.7 MPa;

wherein said underlying tread (undertread) rubber layer contains a dispersion throughout of about 0.25 to about 10, preferably from about 0.5 to about 5, phr of short fibrillated fiber aramid pulp.

In practice, the rubber composition of the tread cap rubber layer may have, for example a Shore A hardness (23° C.) in a range of from 55 to about 75.

A summary of Shore hardness and stress-strain modulus parameters for the rubber composition of the underlying (transition or undertread) tread rubber layer is illustrated in the following Table A.

TABLE A

Comfort Indicator Shore A Hardness (23° C.)

20 to 50, alternately 25 to 45
Handling Indicator

Stress-strain modulus at 100% strain for internal transition rubber layer
| | |
|---|---|
| Minimum parallel modulus[1] | 1 MPa |
| Minimum perpendicular modulus[1] | 0.7 MPa |

[1]ASTM D412. The parallel 100 percent strain (100 percent dynamic elongation) modulus is taken in the direction of the grain of the cured extruded rubber sample. The perpendicular 100 percent strain (100 percent dynamic elongation) modulus is taken in the direction perpendicular to the grain of the cured extruded rubber sample.

In one embodiment, said short fibrillated aramid fiber pulp is substantially oriented in the circumferential direction (typically parallel to the grain of the rubber) in the underlying transition tread rubber layer.

Such orientation of the fibrillated aramid short fibered pulp is caused, for example, by high shear extrusion of the rubber to an uncured tread layer strip form, and therefore with the grain of extruded uncured rubber which is subsequently cured (vulcanized) at an elevated temperature.

It is to be appreciated that the underlying transition tread rubber composition is not a cellular rubber composition and is therefore exclusive of cellular rubber configuration.

The aramid material for the fibrillated aramid pulp might be described, for example, as a long chain synthetic aramid polyamide in which at least about 85 percent of the aramid linkages are attached to two aromatic rings. The aramid, for example, might be referred to as primarily being a poly(paraphenyleneterephthalamide).

The fibrillated aramid fiber might be referred to, for example, as a very short aramid fiber having a trunk portion with a plurality of fibrils extending outwardly from the trunk along a significant portion of its length having diameters significantly smaller than the diameter of its trunk from which they extend. For an exemplary description, see U.S. Pat. No. 4,871,004. The aramid might be provided, for example, as a pulp form of aramid fiber contained in a natural rubber matrix as a Kevlar™ product from E.I. DuPont de Nemours & Co., Inc.

A significant aspect of this invention is providing the underlying transition (undertread) tread rubber composition having minimum parallel and lateral (perpendicular to the parallel direction of the extruded grain of the rubber) tensile modulus properties at a 100 percent dynamic strain combined with a Shore A hardness value in a range of from about 20 to about 50.

Various rubber reinforcing carbon blacks might be used for the underlying tread (undertread) rubber composition. Representative of various rubber reinforcing blacks which may be considered may be found, for example, in *The Vanderbilt Rubber Handbook* (1978), Page 417.

In practice, the underlying transition (undertread) tread rubber composition may be prepared, for example, in at least one preparatory (non-productive) mixing step in an internal rubber mixer, often a sequential series of at least one, usually two, separate and individual preparatory internal rubber mixing steps, or stages, in which the diene-based elastomer is first mixed with the prescribed silica and/or carbon black and short fibers followed by a final mixing step (productive mixing step) in an internal rubber mixer, or optionally on an open mill mixer, where curatives (sulfur and sulfur vulcanization accelerators) are blended at a lower temperature and for a substantially shorter period of time.

It is conventionally required after each internal rubber mixing step that the rubber mixture (composition) is actually removed from the rubber mixer and cooled to a temperature below 40° C., perhaps to a temperature in a range of about 20° C. to about 40° C. and then added back to an internal rubber mixer for the next sequential mixing step, or stage.

Such non-productive mixing, followed by productive mixing is well known by those having skill in such art.

The forming of a tire component is contemplated to be by conventional means such as, for example, by extrusion, or by calendering, of rubber composition to provide a shaped, unvulcanized rubber component such as a tire tread layer. Such forming of a tire tread (layers) is well known to those having skill in such art.

It is understood that the tire, as a manufactured article, is prepared by shaping and curing the assembly of its components at an elevated temperature (e.g. 140° C. to 170° C.) and elevated pressure in a suitable mold. Such practice is well known to those having skill in such art.

It is readily understood by those having skill in the pertinent art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of fatty acids, if used, which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least two stages, namely, at least one non-productive (preparatory) stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

EXAMPLE I

Rubber compositions were prepared for evaluating an effect of providing short fribulated aramid pulp reinforcement in a rubber composition for use as an underlying transition tread rubber layer (undertread) for a tire tread.

Rubber Sample A represents a relatively stiff silica reinforced rubber composition for an outer tread rubber cap layer.

Rubber Sample B represents a considerably softer rubber composition as a candidate for an underlying tread rubber layer.

Rubber Samples C, D and E represent the rubber composition of rubber Sample B with 3 phr of a dispersion of short fibrillated aramid fiber pulp with 0, 20 or 30 phr of particulate filler reinforcement being carbon black.

The rubber compositions were prepared by mixing the ingredients in sequential non-productive (NP) and productive (PR) mixing steps in one or more internal rubber mixers.

The basic formulation for the rubber Samples is presented in the following Table 1 and recited in parts by weight unless otherwise indicated.

TABLE 1

| | Parts |
|---|---|
| Non-Productive Mixing Step (NP), (mixed to 160° C.) | |
| Natural rubber[1] | 0, 55 and 60 |
| Natural rubber contained in the aramid pulp | 0 and 10 |
| Cis 1,4-polybutadiene rubber[2] | variable |
| Short fibrillated aramid fiber pulp[3] | 0 and 3 |
| Carbon black (N550)[4] | 0 and 20 |
| Precipitated silica[5] | 73 and 0 |
| Rubber processing oil | variable |
| Fatty acid[6] | 2 |
| Zinc oxide | 2 |
| Productive Mixing Step (PR), (mixed to 110° C.) | |
| Sulfur and sulfur cure accelerators[7] | 2.6 |

[1]Natural cis 1,4-polyisoprene rubber
[2]Cis 1,4-polybutadiene rubber as Budene™ 1207 from The Goodyear Tire & Rubber Company
[3]Aramid short fibrillated fiber pulp as a masterbatch comprised of natural rubber and short fibrillated fiber pulp as a Kevlar™/NR (natural cis 1,4-polyisoprene rubber) masterbatch containing 23 percent modified short Kevlar aramid fibers from E.I. DuPont de Nemours & Co. as Merge™ IF722. The aramid short fiber pulp is reported in Table I as the aramid short fiber pulp itself, namely as 0 or 3 phr thereof.
[4]Rubber reinforcing carbon black as N550, an ASTM designation
[5]Precipitated silica as Zeosil 1165 MP™ from the Rhodia company
[6]Fatty acid comprised primarily of stearic acid and a minor amount of other fatty acids comprised primarily of palmitic and oleic acids.
[7]Sulfur and sulfur cure accelerators of the sulfenamide and thiuram types The following Table 2 illustrates cure behavior and various physical properties of rubber compositions based upon the basic formulation of Table 1 with the amounts of materials reported in terms of parts by weight per 100 parts by weight rubber (phr).

TABLE 2

| | Controls | | Experimental | | |
|---|---|---|---|---|---|
| | A | B | C | D | E |
| Natural rubber | 0 | 60 | 55 | 55 | 60 |
| Natural rubber contained in aramid pulp | 0 | 0 | 10 | 10 | 10 |
| Cis 1,4-polybutadiene rubber | 0 | 40 | 35 | 35 | 30 |
| Short fibrillated aramid fiber pulp | 0 | 0 | 3 | 3 | 3 |
| Carbon black | 0 | 20 | 0 | 20 | 30 |
| Precipitated silica | 73 | 0 | 0 | 0 | 0 |
| Rubber processing oil | 21 | 14 | 14 | 14 | 5 |
| Comfort Indicator (softer is better within criteria of Table A) | | | | | |
| Shore A hardness (23° C.) | 72 | 35 | 34 | 43 | 64 |
| Handling Indicator (higher 100% strain modulus value is better within criteria of Table A) | | | | | |
| Stress-strain. ASTM D412, Parallel (in the direction of the grain of the extruded rubber)[1] | | | | | |
| Modulus, tensile, 50 percent strain (MPa) | 1.57 | 0.50 | 0.65 | 1.25 | 5.13 |
| Modulus, tensile, 100 percent strain (MPa) | 2.60 | 0.72 | 1.5 | 2.68 | 5.57 |
| Modulus, tensile, 300 percent strain (MPa) | 11.0 | 2.13 | 2.54 | 4.05 | 10.7 |
| Break strength (MPa) | 18.6 | 9.49 | 4.97 | 8.62 | 18.3 |
| Elongation at break (%) | 477 | 652 | 549 | 519 | 456 |
| Stress-strain, ASTM D412, Perpendicular (at right angle to the direction of the grain of the extruded rubber)[1] | | | | | |
| Modulus, tensile, 50 percent strain (MPa) | 1.59 | 0.49 | 0.47 | 0.6 | 1.4 |

TABLE 2-continued

|  | Controls | | Experimental | | |
| --- | --- | --- | --- | --- | --- |
|  | A | B | C | D | E |
| Modulus, tensile, 100 percent strain (MPa) | 2.62 | 0.68 | 0.73 | 0.9 | 2.36 |
| Modulus, tensile, 300 percent strain (MPa) | 10.5 | 1.89 | 1.61 | 2.49 | 8.03 |
| Break strength (MPa) | 19 | 8.4 | 6.05 | 7.6 | 17 |
| Elongation at break (%) | 501 | 636 | 686 | 575 | 497 |

[1]ASTM D412. The parallel 100 percent strain (100 percent dynamic elongation) modulus is taken in the direction of the grain of the cured extruded rubber sample. The perpendicular 100 percent strain (100 percent dynamic elongation) modulus is taken in the direction perpendicular to the grain of the cured extruded rubber sample.

From the Comfort Indicator aspect, it can be seen from Table 2 that only rubber compositions B, C and D have Shore A Hardness values of 35, 34 and 43, respectively within the criteria range of 20 to 50 indicated in Table A and illustrated in FIG. 1 and, also, which are substantially below, and therefore significantly softer than, the value of 72 for rubber composition A.

However, the Shore A Hardness value of 64 for rubber composition E is clearly above, and therefore outside, the significantly softer Shore A Hardness criteria range of 20 to 50 indicated in Table A.

This is considered herein to be significant in a sense of demonstrating that the level of reinforcing filler, namely the rubber reinforcing carbon black, should be lower than 30 phr for the inclusion of 3 phr of the short fibrillated aramid fiber.

From the Handling Indicator aspect, it can further be seen from Table 2, and illustrated in FIG. 2, that only rubber compositions C, D and E have satisfactory parallel 100 percent strain (100 percent dynamic elongation) modulus values which are higher than 1.0 MPa and perpendicular 100 percent strain modulus values higher than 0.7 MPa.

However, it is readily seen that rubber composition E was not satisfactory because of its high Shore A hardness value of 64 which is significantly above the maximum value of 50 for the Comfort Indicator requirement reported in Table A.

Therefore, it is concluded that only rubber compositions C and D are satisfactory for use for the undertread (internal transition tread rubber layer) of this invention since they pass both the Shore A hardness Comfort Indicator limitation prescribed in Table A and the Handling Indicator also prescribed in Table A, namely a parallel tensile modulus value of greater than 1 MPa and a lateral tensile modulus value of greater than 0.7 MPa at a dynamic strain of 100 percent.

BRIEF DESCRIPTION OF DRAWINGS

Drawings are presented in a form of FIGS. 1 and 2, namely FIGS. 1 and 2, to visually present data for compounds A through E contained in Table 2.

Drawings are also presented in a form of FIG. 3, namely FIG. 3, to depict a tire tread cross section of the invention.

Figure 4:
Figure 5:
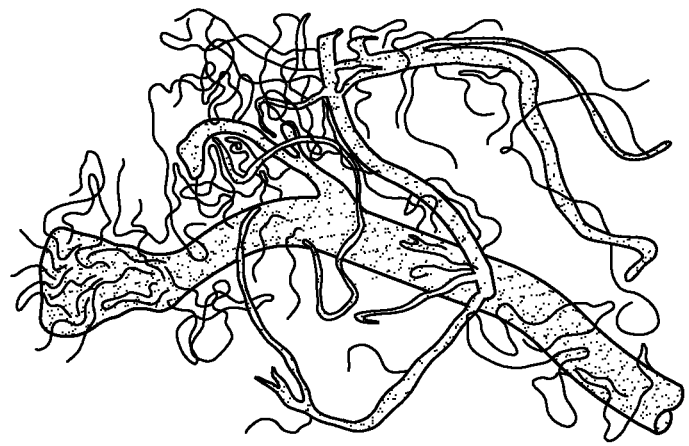

Drawings are further presented in a form of FIGS. 4 and 5, namely FIGS. 4 and 5, to depict a conventional tire filament reinforcement with minimal, if any, fibrillation and a substantially fibrillated tire filament reinforcement.

THE DRAWINGS

Figure 1:
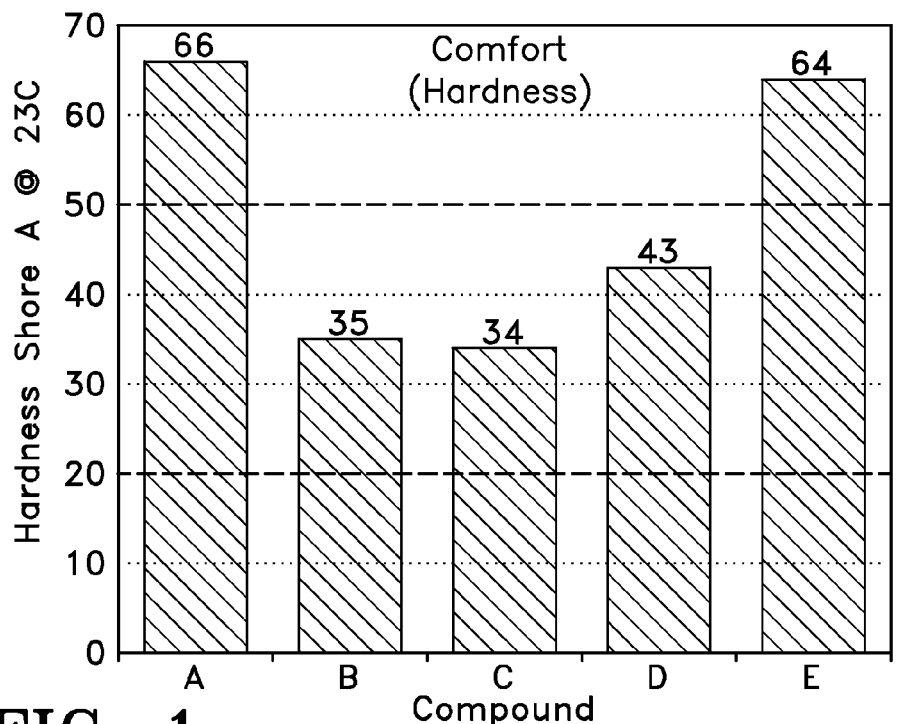

FIG. 1 is a bar graph presenting Shore A hardness (23° C.) for each of the compounds (rubber compositions) A through E.

From FIG. 1 it can be seen that a rubber composition representing an outer tread cap rubber layer intended to be ground contacting with its Shore A Hardness value (23° C.) of 66 is well above Shore Hardness (23° C.) values of 35, 34 and 43 for rubber compounds B, C and D, respectively, proposed for a significantly softer underlying tread rubber composition.

From FIG. 1 it can further be seen that the Shore A (23° C.) hardness value of 64 for rubber composition E is significantly high and clearly above the desired range of 20 to 50 Shore A Hardness (23° C.) values for the underlying transition rubber layer.

Figure 2:
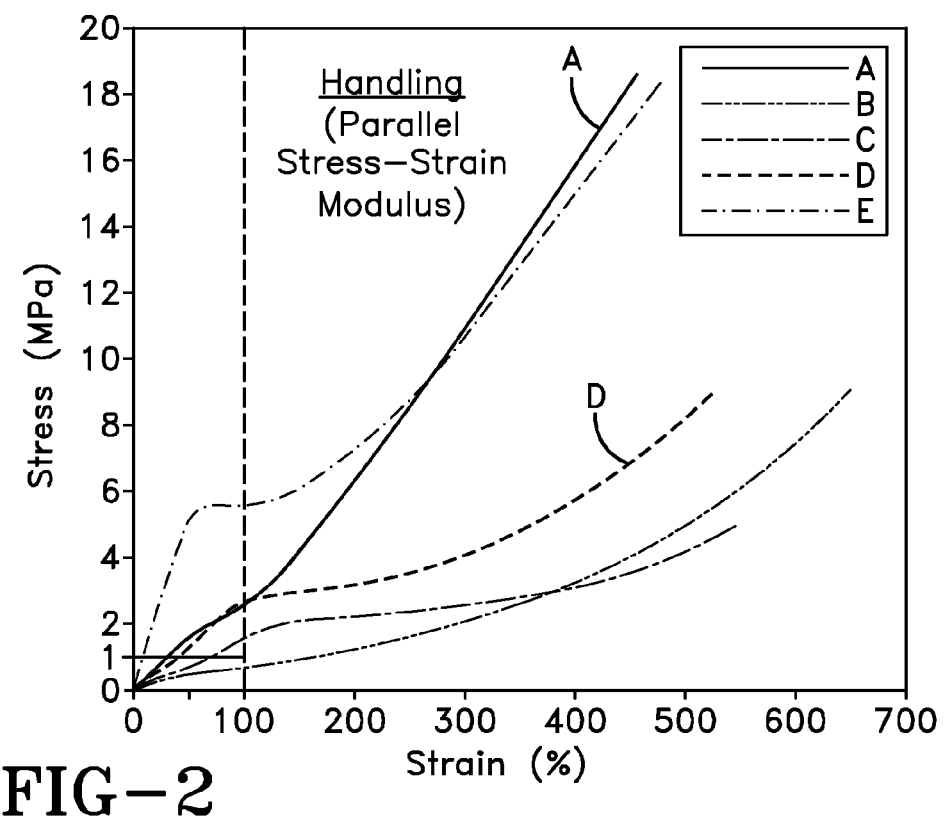

FIG. 2 depicts stress (MPa) in terms of Modulus versus the percent strain for each of the compounds (rubber compositions) A through E and particularly focuses upon the low strain region of the curves within 50 and 100 percent strain value, and particularly the 100 percent strain value, for the comparative stress (tensile Modulus) values.

Figure 3:
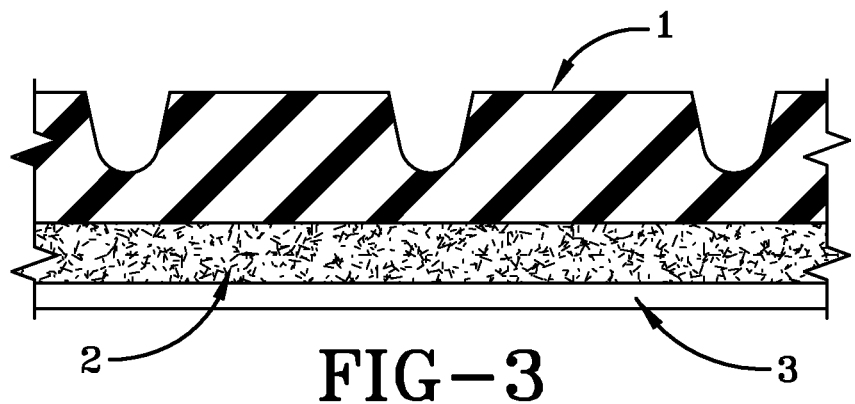

FIG. 3 is a representation of a cross section of a tread depicting an outer tread cap rubber layer (1), an underlying transition tread rubber layer (2) and a base tread rubber layer (3).

FIG. 3 depicts an example of a tread cross section of this invention where:

(A) the tread cap rubber layer composition is of a Shore A Hardness (23° C.) value of about 72 and 100 percent strain modulus value of at least about 2.6 MPa, and (B) the underlying transition rubber composition has a Shore A Hardness (23° C.) of about 43 and a 100 percent strain modulus value of about 2.7 MPa.

FIGS. 4 and 5 are presented to depict representations of conventional straight fiber with minimal or no fibrillations for FIG. 4 and substantially fibrillated aramid fiber for FIG. 5.

In particular, it is seen from FIG. 5 that the aramid fiber is substantially fibrillated with extensive entangled fibrils extending from the trunk of the aramid fiber. This is considered to be important for the practice of this invention in the sense of providing reinforcement of the cured rubber composition in the direction perpendicular to the orientation of the fibers (in the lateral direction of the ultimate tire tread) which have been significantly oriented in the direction of the grain of the uncured rubber composition during the formative extrusion of the uncured rubber composition.

While certain representative embodiments and details have been shown for the purpose of illustrating the subject invention, it will be apparent to those skilled in this art that various changes and modifications can be made therein without departing from the scope of the subject invention.

What is claimed is:

1. A tire having a rubber tread comprised of a circumferential tread outer cap rubber layer and a transition rubber layer underlying said outer cap rubber layer;

wherein said outer tread cap rubber layer is comprised of a lug and groove configuration with raised lugs having tread running surfaces on the outer surfaces of said lugs and with grooves positioned between said lugs, wherein said transition rubber layer is excluded from the running surface of the tire and is a non-cellular rubber composition;

wherein the rubber composition of said transition rubber layer is comprised of:

(A) a blend of natural rubber, cis 1,4-polybutadiene rubber and styrene/butadiene copolymer rubber;

(B) about 5 to about 25 phr of reinforcing filler comprised of:

(1) rubber reinforcing carbon black, or (2) amorphous synthetic silica (precipitated silica), or (3) a combination of rubber reinforcing carbon black and precipitated silica;

wherein said transition rubber layer has a stiffness property as:
(C) Shore A hardness (23° C.) in a range of from 25 to about 45, and at least 10 Shore A hardness (23° C.) units less than the Shore A hardness of the rubber composition of the tread cap rubber layer;
(D) 100 percent parallel tensile modulus of at least 1 MPa, and
(E) 100 percent perpendicular tensile modulus of at least 0.7 MPa;
wherein said transition rubber layer contains a dispersion of about 0.25 to about 10 phr of short fibrillated fiber aramid pulp.

2. The tire of claim 1 wherein the rubber composition of said transition rubber layer contains from about 5 to about 25 phr of rubber reinforcing carbon black without precipitated silica reinforcing filler.

3. The tire of claim 1 wherein the rubber composition of said transition rubber layer contains from about 5 to about 25 phr of precipitated silica reinforcing filler without rubber reinforcing carbon black.

* * * * *